United States Patent
Schätzle et al.

(10) Patent No.: US 11,892,079 B2
(45) Date of Patent: Feb. 6, 2024

(54) PROCESS CONNECTION HAVING AN ANNULAR GASKET

(71) Applicant: SICK AG, Waldkirch (DE)

(72) Inventors: Sebastian Schätzle, Waldkirch (DE); Jochen Scholder, Waldkirch (DE)

(73) Assignee: SICK AG, Waldkirch (DE)

( * ) Notice: Subject to any disclaimer, the term of this patent is extended or adjusted under 35 U.S.C. 154(b) by 202 days.

(21) Appl. No.: 16/999,294

(22) Filed: Aug. 21, 2020

(65) Prior Publication Data
US 2021/0054933 A1 Feb. 25, 2021

(30) Foreign Application Priority Data
Aug. 22, 2019 (DE) .......................... 102019122624.4

(51) Int. Cl.
*F16J 15/10* (2006.01)
*F16J 15/08* (2006.01)
*G01L 19/00* (2006.01)

(52) U.S. Cl.
CPC ......... *F16J 15/104* (2013.01); *F16J 15/0818* (2013.01); *G01L 19/0007* (2013.01)

(58) Field of Classification Search
CPC .. F16L 37/092; F16J 13/12; F16J 15/10; F16J 15/0818; F16J 15/104; G01L 19/0007
See application file for complete search history.

(56) References Cited

U.S. PATENT DOCUMENTS

| 1,983,228 | A | * | 12/1934 | Hall | ........................ | F16L 21/04 |
| | | | | | | 138/DIG. 6 |
| 3,058,752 | A | * | 10/1962 | Miller | .................... | F16J 15/104 |
| | | | | | | 277/944 |
| 4,295,668 | A | * | 10/1981 | Louthan | .................. | F16L 47/24 |
| | | | | | | 285/239 |
| 4,449,718 | A | | 5/1984 | Miller | | |

(Continued)

FOREIGN PATENT DOCUMENTS

| CN | 204083487 U | 1/2015 |
| CN | 205534205 U | 8/2016 |

(Continued)

OTHER PUBLICATIONS

German Office Action dated Jun. 22, 2020 corresponding to application No. 102019122624.4.

*Primary Examiner* — Eugene G Byrd
(74) *Attorney, Agent, or Firm* — Nath, Goldberg & Meyer; Jerald L. Meyer; Stanley N. Protigal

(57) ABSTRACT

A process connection having an annular gasket and having a cylindrical measuring probe of a sensor, wherein the gasket is provided to seal a process environment, wherein the gasket is disposed between the process connection and the measuring probe, the gasket is fixable by means of a downholder, the gasket contacts a first annular sealing edge at the process connection, the gasket surrounds the cylindrical measuring probe at a second annular sealing edge, the gasket has at least one conical outer jacket surface having a conical outer jacket angle, and the process connection has a (Continued)

conical inner surface having a conical inner angle, wherein the gasket contacts the first annular sealing edge of the conical inner surface of the process connection, and wherein the conical outer jacket angle is smaller than the conical inner angle.

11 Claims, 8 Drawing Sheets

(56) References Cited

U.S. PATENT DOCUMENTS

| | | | |
|---|---|---|---|
| 4,898,081 A | 2/1990 | Fecher | |
| 6,199,432 B1* | 3/2001 | Dunn | F17D 3/00 |
| | | | 73/756 |
| 9,599,266 B2* | 3/2017 | Schreckenberg | F16L 37/0925 |
| 9,829,135 B2* | 11/2017 | Hanne | F16L 37/0927 |
| 2004/0084902 A1 | 5/2004 | Smith, III | |
| 2005/0218652 A1* | 10/2005 | Sakamoto | F16L 21/04 |
| | | | 285/343 |
| 2007/0216105 A1* | 9/2007 | Fessele | G01L 19/0007 |
| | | | 277/318 |
| 2010/0059940 A1* | 3/2010 | Monteil | F16L 21/03 |
| | | | 277/627 |
| 2014/0374995 A1* | 12/2014 | Monteil | F16J 15/104 |
| | | | 277/626 |
| 2015/0152990 A1* | 6/2015 | Lopez-Chaves | F16L 37/0845 |
| | | | 277/609 |
| 2016/0025222 A1 | 1/2016 | Buchholz et al. | |
| 2016/0281890 A1* | 9/2016 | Hicks | F16L 21/022 |
| 2018/0149269 A1* | 5/2018 | Schneider | F16J 15/102 |
| 2019/0003652 A1* | 1/2019 | Stautner | F16J 15/104 |
| 2020/0003307 A1* | 1/2020 | Grill | F16J 15/104 |
| 2022/0003342 A1* | 1/2022 | Bichler | B29C 45/14065 |

FOREIGN PATENT DOCUMENTS

| | | | |
|---|---|---|---|
| DE | 1858498 | 9/1962 | |
| DE | 3225906 A1 | 1/1984 | |
| DE | 10105544 A1 | 1/2003 | |
| DE | 102007030847 A1 | 1/2009 | |
| EP | 1018617 A2 | 7/2000 | |
| JP | 2012007727 A * | 1/2012 | |
| JP | 2014118912 A * | 6/2014 | F02F 7/006 |

* cited by examiner

PROCESS CONNECTION HAVING AN ANNULAR GASKET

FIELD

The present invention relates to a process connection having an annular gasket and having a cylindrical measuring probe of a sensor.

BACKGROUND

A process connection serves to mount a sensor in a process system such that a measuring probe can project into the process environment and components of the sensor such as a sensor housing with control buttons and display fields are arranged outside the process environment protected from the process environment.

Such sensors are, for example, flow sensors or flow monitors of the applicant having the name T-Easic FTS.

Various sensors that, for example, measure the filling level or the temperature are known for determining process parameters of a medium in a container. Although there are also contactless measuring methods, a number of sensors use a probe that dips into the medium to be measured. The filling level measurement using time domain reflectometry (TDR) known from DE 10 2007 030 847 A1, for example, measures the time of flight of microwave pulses guided in the probe up to the surface of the medium.

These process connections are commercial clamping ring screw connections that are available as catalogue products. The clamping ring screw connections are a common means to install and connect measuring probes or also pipes in a process in process metrology. The clamping ring screw connections do not seal hygienically in accordance with the European Hygienic Engineering and Design group (EHEDG). A large number of narrow gaps in which bacteria can settle are present at the process side.

The EHEDG issues certifications for products in the field of hygienic process metrology.

The EHEDG has various guidelines for design in the food-contact hygiene sector. How slide ring seals for hygiene applications have to be designed is described in Guideline DOC25. They should be designed in the form of a lip seal. However, such lip seals are not sufficiently pressure resistant.

There are furthermore fixedly installed process connections at a sensor housing. A common method of providing hygienic connections of components, for example a process connection, at a sensor housing is to weld the components together. The weld seam provides a gap-free transition between the sensor housing and the process connection. This connection can, however, not be released by the user again. The process connection is firmly fixed and can no longer be changed.

SUMMARY

It is an object of the invention to provide a process connection that is deemed hygienic in accordance with the EHEDG and is impermeable and is simultaneously variably positionable at a measuring probe of a process measuring sensor system.

It is a further object of the invention to provide a process connection or an adapter with which it is possible to provide a hygienic process connection for a sensor by means of a commercial clamping ring screw connection and the process connection. The process connection should be flexibly positionable on the measuring probe and should be replaceable.

The object is satisfied by a process connection having an annular gasket and having a cylindrical measuring probe of a sensor, wherein the gasket is provided to seal a process environment, wherein the gasket is disposed between the process connection and the measuring probe, the gasket is fixable by means of a downholder, the gasket contacts a first annular sealing edge at the process connection, the gasket surrounds the cylindrical measuring probe at a second annular sealing edge, the gasket has at least one conical outer jacket surface having a conical outer jacket angle, and the process connection has a conical inner surface having a conical inner angle, wherein the gasket contacts the first annular sealing edge of the conical inner surface of the process connection, and wherein the conical outer jacket angle is smaller than the conical inner angle.

The process environment is thereby impermeably sealed with respect to an outer environment. Water or oil-based liquids are, for example, present in the process environment. The process temperature has temperatures from, for example, −40° C. to +150° C. The process pressure amounts, for example, up to 16 bar.

The gasket is produced from a flexible material, for example an elastomer (FKM, EPDM, NBR) or, for example, from a silicone. The gasket has a conical shape at the end that has the second annular sealing edge. The gasket is placed into a seal seat of the process connection. The downholder exerts a defined force on the gasket.

The gasket is fixed by means of the downholder mounted in the process connection. Compressive forces are produced on the gasket via the downholder due to the assembly. These compressive forces provide that the conical shape of the gasket molds onto the measuring probe and seals the measuring probe without gaps. The seal is thereby hygienic in the sense of the EHEDG. The downholder presses the gasket in and seals at the first annular sealing edge at the process connection hygienically without a gap.

The conical outer jacket angle of the conical outer jacket surface of the gasket is smaller than the conical inner angle of the conical inner surface of the process connection, whereby the gasket sealingly contacts the first annular sealing edge at the conical inner surface of the process connection. The first annular sealing edge also, for example, contacts a planar side of the process connection that faces the process environment. The conical outer jacket surface of the gasket thus contacts the first annular sealing edge of the conical inner surface of the process connection.

The second annular seal is outwardly displaced by the pushing of the measuring probe into the gasket at the second annular seal. In this process, the first annular sealing edge acts as a counter-bearing or as a pivot point, which further amplifies the sealing effect at the first annular sealing edge.

Due to the shape of the gasket, the gasket has a self-amplifying sealing edge function at the second annular sealing edge as the process pressure increases.

A smallest diameter of the gasket, for example, has a diameter of 7.6 mm and the measuring probe, for example, has a diameter of 8 mm. The peripheral preload for the second annular sealing edge accordingly peripherally amounts to, for example, 0.2 mm.

In accordance with the invention, smaller or larger diameters of the gasket or of the measuring probe can also be provided.

In a further development of the invention, the downholder has a thread. The downholder can thereby be pressed toward the gasket by a rotary movement. High forces can thereby be exerted on the gasket. If the downholder is implemented with the thread, the force can be applied by a defined torque.

In a further development of the invention, a spacer is arranged between the downholder and the gasket. The spacer, for example, has a higher friction with respect to the gasket than with respect to the downholder. A slide bearing is thus formed between the downholder and the spacer on the assembly of the downholder. Only compressive forces are thus exerted on the gasket and no rotary forces that could lead to a slipping of the gasket. The position of the gasket in installation is thus ensured.

The spacer composed of a hard material, steel for example, can be used to avoid an inward bulging of the gasket toward the measuring probe on the application of the compressive force by the downholder. This spacer provides that the gasket composed of a soft material only bulges outwardly. The spacer also maintains its shape after exertion of the force by the downholder.

In a further development of the invention, the downholder has a nose that projects into the gasket. The nose can also be called a protrusion since the nose projects at least partly into the gasket and thus stabilizes and/or positions the gasket.

The nose at the downholder in a straight shape or in a conical shape can, for example, produce a desired action of the unwanted inward bulging of the gasket toward the measuring probe.

In a further development of the invention, dot-shaped burls are arranged along a periphery at a circular cylindrical outer surface of the gasket.

A radial centration of the gasket takes place in a cylindrical section or nose of the process connection that is configured as a counter-bearing of the gasket. The burls integrated in the gasket provide a tolerance compensation between the support and the gasket, on the one hand, and a sufficient air gap that serves as a displacement space for the gasket, on the other hand. This displacement space is required since elastomers as a material for the gasket are not compressible.

The burls can be simply integrated at the outer diameter of the gasket in that a separation plane of the manufacturing tool is selected accordingly.

The gasket remains seated at the outer diameter in the seal seat of the process connection and remains in shape, for example.

8 burls are, for example, evenly distributed at equidistant intervals at the circular cylindrical outer surface.

In a further development of the invention, linear ribs are arranged along a periphery at a circular cylindrical inner surface of the gasket, with the linear ribs being in parallel with one another.

The centration of the measuring probe likewise takes place using the linear ribs in a cylindrical part of the gasket. The ribs integrated in the gasket provide a tolerance compensation between the measuring probe and the gasket, on the one hand, and a sufficient air gap that serves as a displacement space for the gasket, on the other hand.

The execution of ribs in the inner diameter of the gasket allows the gasket to be able to be simply demolded in manufacture so that no undercuts are present.

The gasket continues to be seated at the inner diameter of at the measuring probe due to the ribs and remains in shape, for example. In addition, the ribs stabilize the gasket so that it withstands the forces of the downholder.

Four ribs are, for example, evenly distributed at equidistant intervals at the circular cylindrical inner surface.

In a further development of the invention, a contact surface of the gasket for the downholder is perpendicular to a longitudinal axis of the measuring probe. The gasket is thereby acted on by a compressive force in parallel with the measuring probe.

In a further development of the invention, the gasket has an acute angle in cross-section at the second annular sealing edge. The sealing effect of the second annular sealing edge is thereby further increased since the contact forces at the second annular sealing edge are increased.

In a further development of the invention, the gasket has an inner conical jacket surface that faces the measuring probe.

In a further development of the invention, a conical angle of the inner conical jacket surface of the gasket and an outer surface of the gasket form an acute angle toward one another. The sealing effect of the second annular sealing edge is thereby further increased since the contact forces at the second annular sealing edge are increased.

In a further development of the invention, the gasket is composed of a flexible material, for example an elastomer (FKM, EPDM, NBR) or of a silicone, for example. The flexible material can have a hardness of 40-90 Shore A, in particular a hardness of 60 to 75 Shore A. The hardness of the material must be selected so that the gasket maintains the correct shape to fulfil its sealing effect. The material itself depends on the type of application and on the environmental conditions.

In a further development of the invention, the measuring probe is displaceably arranged in the gasket. The measuring probe can thereby be adapted to the use or to the application.

In a further development of the invention, the gasket can be retrofitted. The measuring probe can be subsequently installed or can be removed again at a later point in time. The process connection is preferably supplied in pre-assembled form so that the process connection is present for a customer in a ready-to-connect form.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

Figure 1:
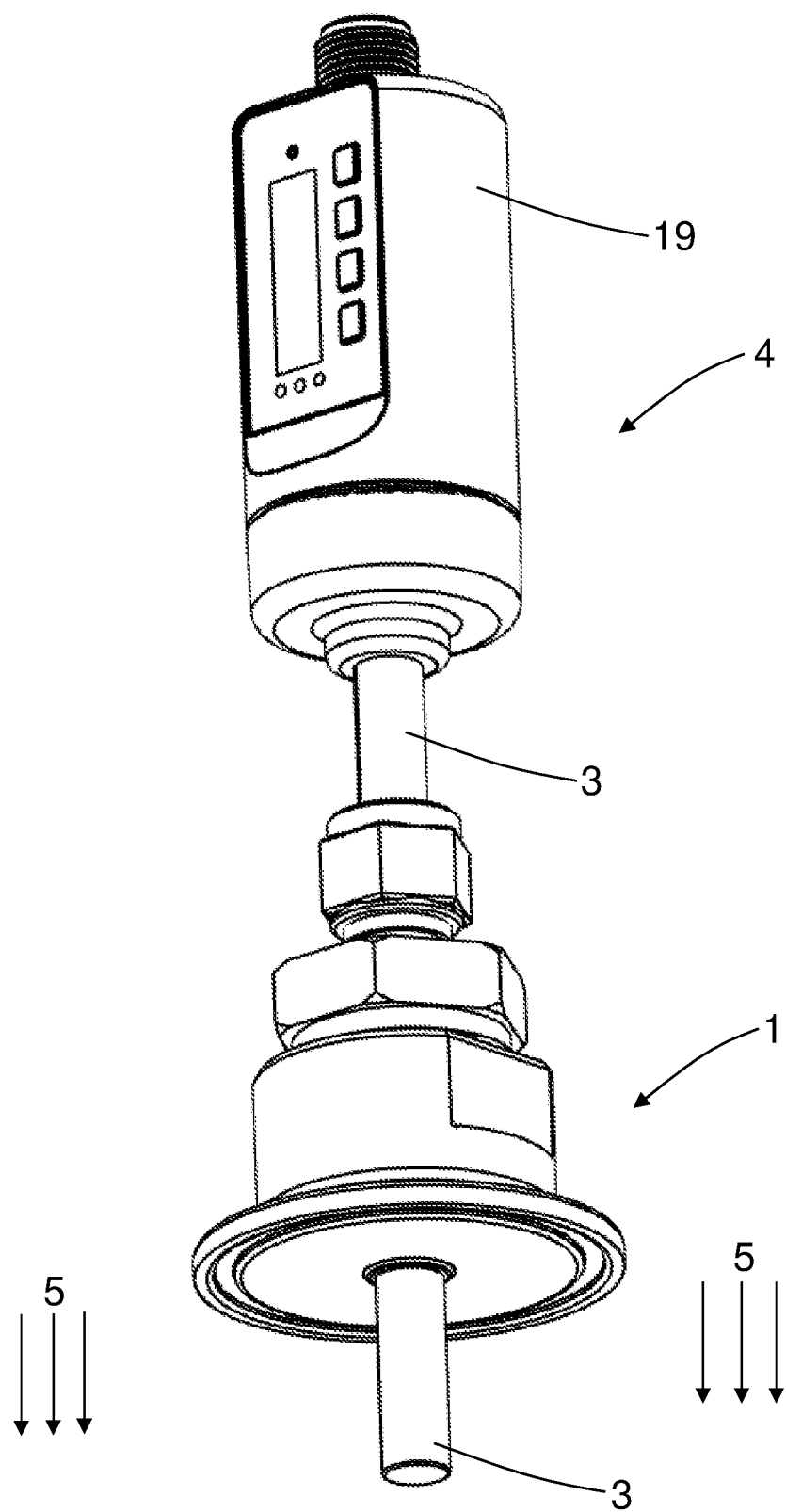
FIG. 1 a sensor with a measuring probe and a process connection.

In the following Figures, identical parts are provided with identical reference numerals.

FIG. 1 shows a sensor 4 having a measuring probe 3 and a process connection 1. The process connection 1 separates a process environment 5 with process environment conditions from the environment in which the housing 19 of the sensor 4 is arranged. Sensor 4 here designates the entire measuring device. The sensor 4 has at least one sensor element.

Figure 2:
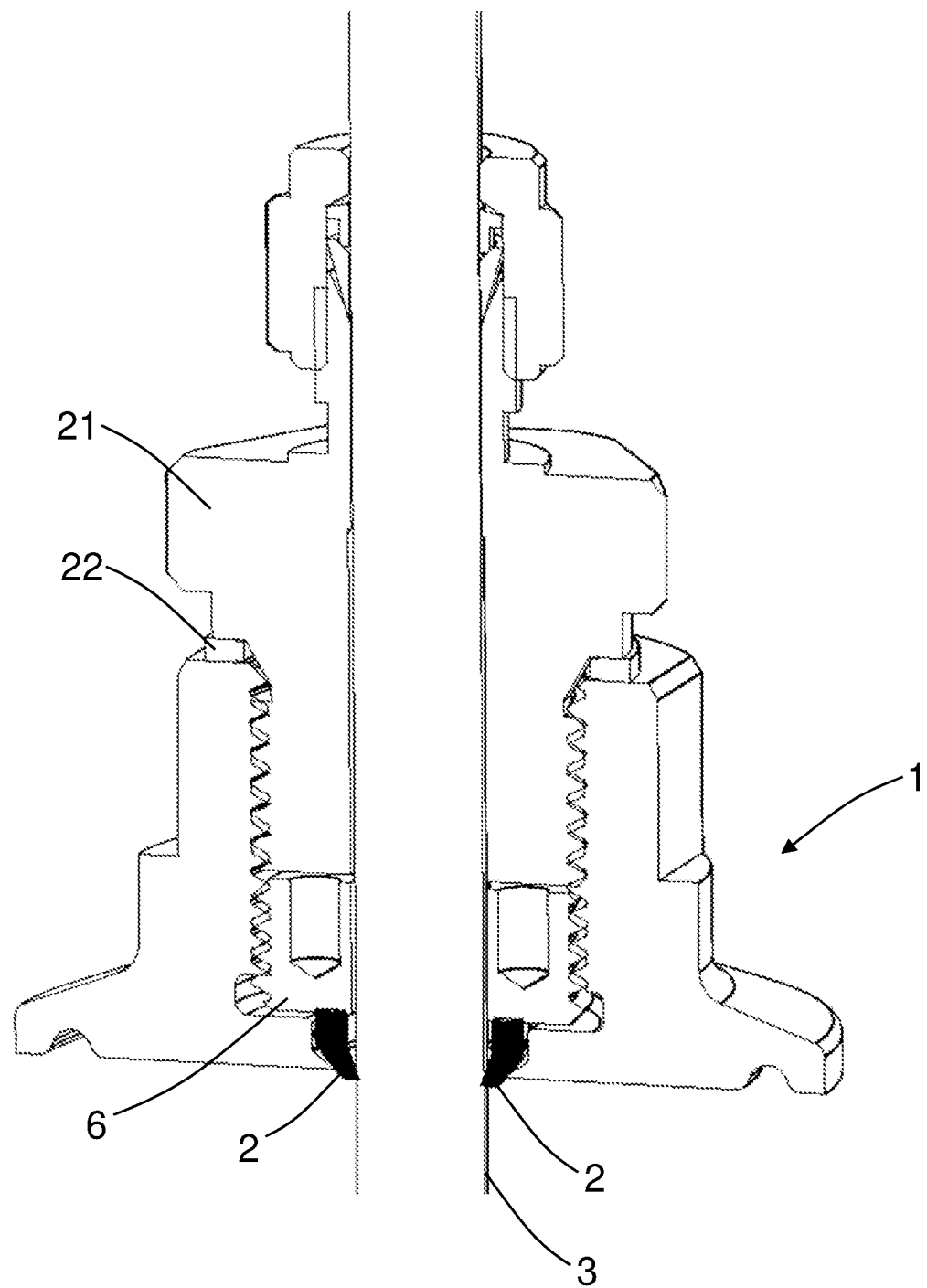
FIG. 2 a section through the process connection in accordance with FIG. 1.

FIG. 2 shows a section through the process connection 1 accordance with FIG. 1. The gasket 2 is shown in the installed state and contacts the cylindrical measuring probe 3. The gasket is fixed by the installation of the downholder 6. The downholder is fixed by the clamping ring screw connection 21. The clamping ring screw connection 21 is sealed by means of a seal 22.

In accordance with FIG. 2, the downholder optionally has a thread. The downholder can thereby be pressed toward the gasket by a rotary movement.

Figure 3:
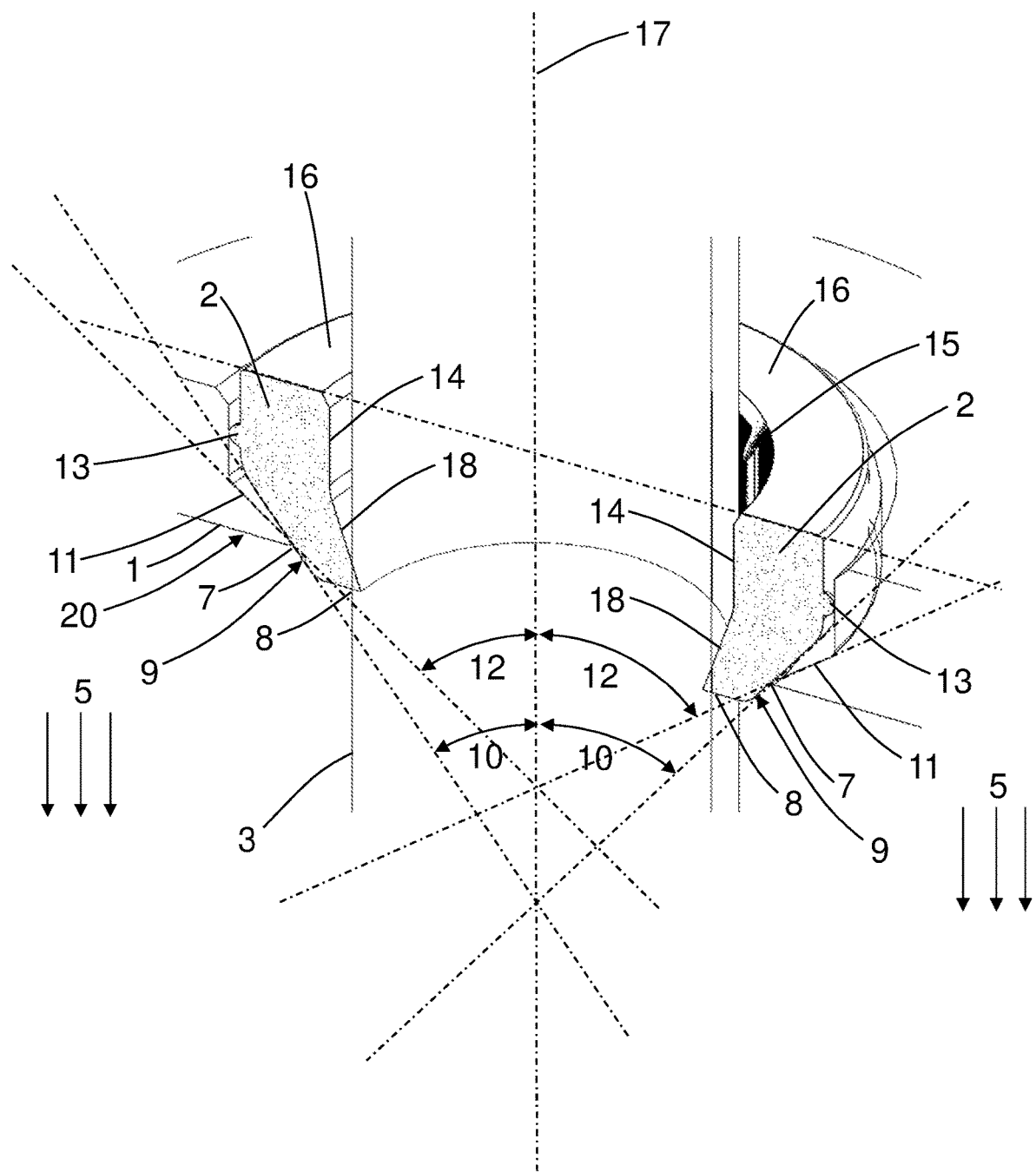
FIG. 3 a gasket and a section through a gasket of the process connection in accordance with FIG. 2 in an enlarged representation.
Figure 4:
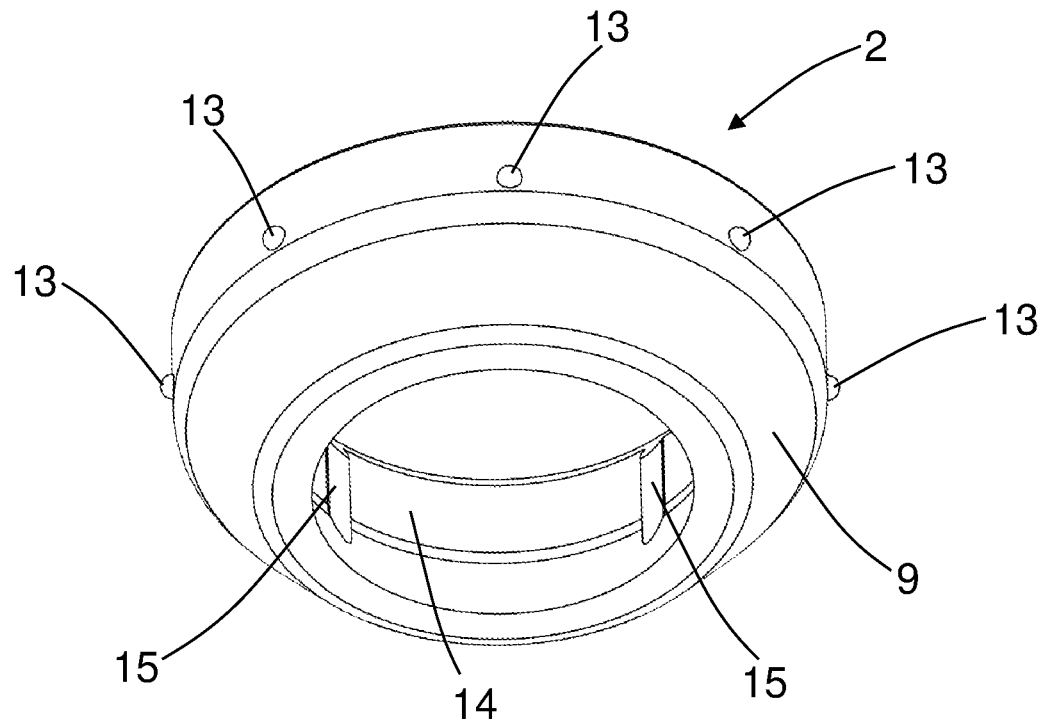
FIG. 4 a gasket in a perspective representation.
Figure 5:
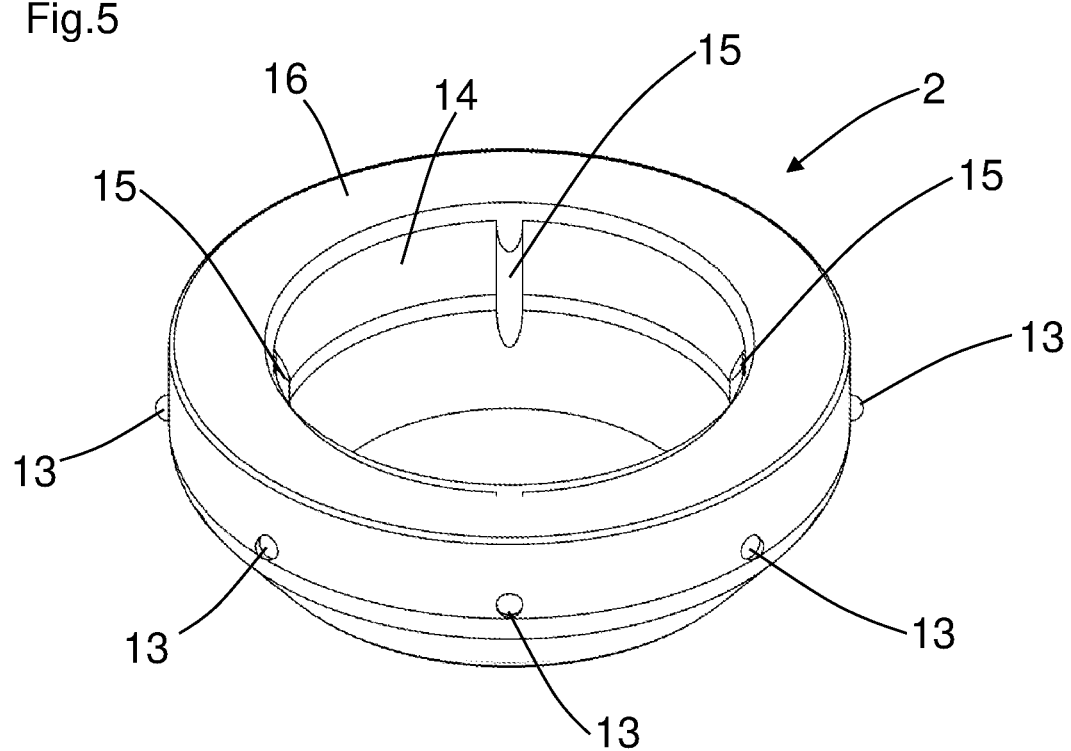
FIG. 5 a gasket in a perspective representation.

FIG. 3 shows the gasket 2 and a section through the gasket 2 of the process connection 1 in accordance with FIG. 2 in an enlarged representation.

FIG. 3 shows the process 1 connection having an annular gasket 2 and having a cylindrical measuring probe 3 of a sensor 4, wherein the gasket 2 is provided to seal a process environment 5, wherein the gasket 2 is disposed between the process connection 1 and the measuring probe 3, the gasket 2 is fixable by means of a downholder 6 (cf. FIG. 2), the gasket 2 contacts a first annular sealing edge 7 at the process connection 1, the gasket 2 surrounds the cylindrical measuring probe 3 at a second annular sealing edge 8, the gasket 2 has at least one conical outer jacket surface 9 having a conical outer jacket angle 10, and the process connection 1 has a conical inner surface 11 having a conical inner angle 12, wherein the gasket 2 contacts the first annular sealing edge 7 of the conical inner surface 11 of the process connection 1, and wherein the conical outer jacket angle 10 is smaller than the conical inner angle 12.

The conical outer jacket angle 10 and the conical inner angle 12 is defined and specified with respect to a longitudinal axis 17 of the measuring probe.

The process environment 5 is thereby impermeably sealed with respect to an outer environment. Water or oil-based liquids are, for example, present in the process environment 5. The process temperature has temperatures from, for example, −40° C. to +150° C. The process pressure amounts, for example, up to 16 bar.

The gasket 2 is composed of a flexible material, in particular from a flexible plastic.

The gasket 2 has a conical shape at the end that has or forms the second annular sealing edge 8. The gasket 2 is placed into a seal seat of the process connection 1. The downholder 6 is installed with a predefined force. If the downholder is implemented with a thread, for example, the force can be applied by a defined torque.

The gasket 2 is fixed by means of the downholder mounted in the process connection 1 (cf. FIG. 2). Compressive forces are produced on the gasket 2 via the downholder due to the assembly. These compressive forces provide that the conical shape of the gasket 2 molds onto the measuring probe 3 and seals the measuring probe 3 without gaps. The gasket 2 or the sealing point is thereby hygienic in the sense of the EHEDG. The downholder presses the gasket 2 in and seals at the first annular sealing edge 7 at the process connection 1 hygienically without a gap.

The conical outer jacket angle 10 of the conical outer jacket surface 9 of the gasket 2 is smaller than the conical inner angle 12 of the conical inner surface 11 of the process connection 1, whereby the gasket 2 sealingly contacts the first annular sealing edge 7 at the conical inner surface 11 of the process connection 1. The first annular sealing edge 7 also, for example, contacts a planar side 20 of the process connection 1 that faces the process environment 5. The conical outer jacket surface 9 of the gasket 2 thus contacts the first annular sealing edge 7 of the conical inner surface 11 of the process connection 1.

The second annular seal 8 is displaced outwardly by the pushing of the measuring probe 3 into the gasket 2 at the second annular seal 8. In this process, the first annular sealing edge 7 acts as a counter-bearing or as a pivot point, which further amplifies the sealing effect at the first annular sealing edge 7.

Due to the shape of the gasket 2, the gasket 2 has a self-amplifying sealing edge function at the second annular sealing edge 8 as the process pressure increases.

A smallest diameter of the gasket 2, for example, has a diameter of 7.6 mm and the measuring probe 3, for example, has a diameter of 8 mm. The peripheral preload for the second annular sealing edge accordingly peripherally amounts to, for example, 0.2 mm.

Smaller or larger diameters of the gasket 2 or of the measuring probe 3 can also be provided.

In accordance with FIGS. 3 to 7, dot-shaped burls 13 are arranged along a periphery at a circular cylindrical outer surface.

A radial centration of the gasket 2 takes place in accordance with FIG. 3 in a cylindrical section or nose of the process connection 1 that is configured as a counter-bearing of the gasket 2. The burls 13 integrated in the gasket 2 provide a tolerance compensation between the support and the gasket 2, on the one hand, and a sufficient air gap that serves as a displacement space for the gasket 2, on the other hand. This displacement space is required since elastomers as a material for the gasket are not compressible.

The burls 13 can be simply integrated at the outer diameter of the gasket 2 in that a separation plane of the manufacturing tool is selected accordingly.

The gasket 2 remains seated at the outer diameter in the seal seat of the process connection 1 and remains in shape, for example, due to the burls 13.

Figure 7:
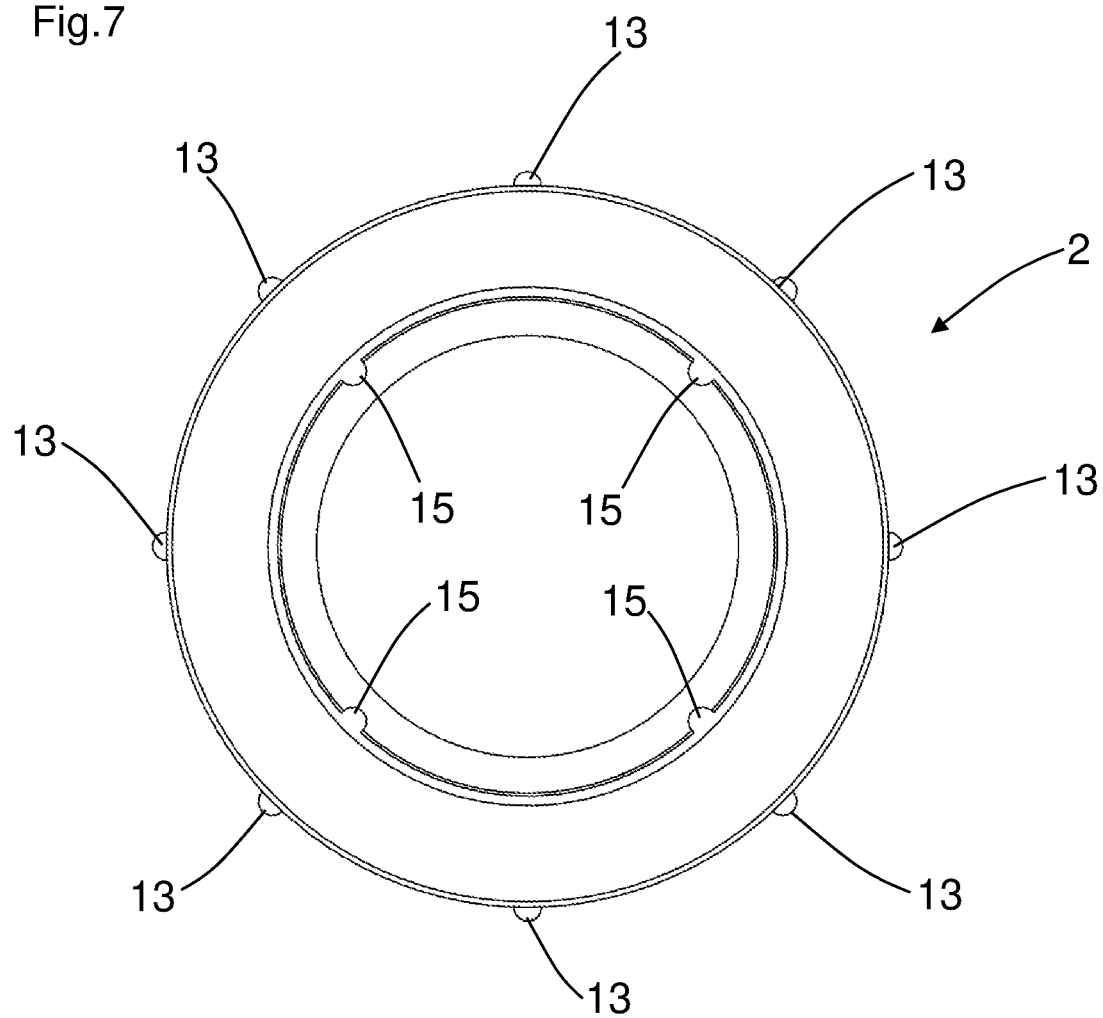
FIG. 7 a gasket in a plan view.

In accordance with FIG. 7 eight burls 13 are, for example, evenly distributed at equidistant intervals at the circular cylindrical outer surface.

In accordance with FIGS. 3 to 7, linear ribs 15 are arranged along a periphery at a circular cylindrical inner surface 14, with the linear ribs 15 being in parallel with one another.

The centration of the measuring probe 3 likewise takes place in accordance with FIG. 3 using the linear ribs 15 in a cylindrical part of the gasket 2. The ribs 15 integrated in the gasket 2 provide a tolerance compensation between the measuring probe 3 and the gasket 2, on the one hand, and a sufficient air gap that serves as a displacement space for the gasket 2, on the other hand.

The execution of ribs 15 in the inner diameter of the gasket 2 allows the gasket 2 to be able to be simply demolded in manufacture so that no undercuts are present.

The gasket 2 continues to be seated at the inner diameter at the measuring probe 3 due to the ribs and 2 remains in shape, for example. In addition, the ribs 15 stabilize the gasket 2 so that it withstands the forces of the downholder.

Figure 6:
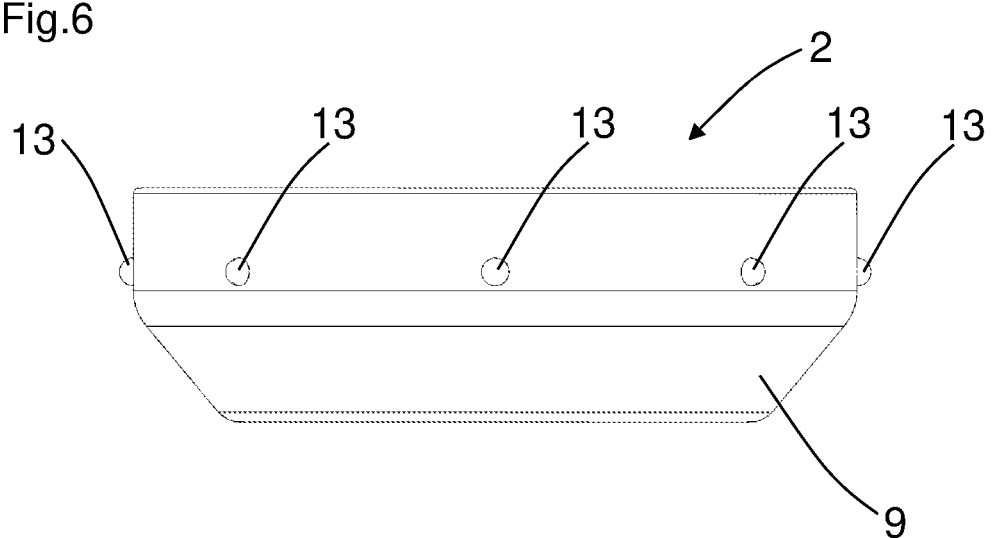
FIG. 6 a gasket in a side view.

FIG. 7 shows a plan view of the gasket. In accordance with FIG. 7, for example, four ribs 15 are evenly distributed at equidistant intervals at the circular cylindrical inner surface. FIG. 6 shows a side view of the gasket having the dot-shaped burls 13.

In accordance with FIG. 3, a contact surface 16 of the gasket 2 for the downholder (cf. FIG. 2) is perpendicular to a longitudinal axis 17 of the measuring probe. The gasket 2 is thereby acted on by a compressive force in parallel with the measuring probe 3.

In a accordance with FIG. 3, the gasket 2 has an acute angle in cross-section at the second annular sealing edge 8. The sealing effect of the second annular sealing edge 8 is thereby further increased since the contact forces at the second annular sealing edge 8 are increased.

In accordance with FIG. 3, the gasket 2 has a conical inner jacket surface 18 that faces the measuring probe 3.

In accordance with FIG. 3, a conical angle of the conical inner jacket surface 18 of the gasket 2 and an outer surface of the gasket 2 form an acute angle toward one another. The sealing effect of the second annular sealing edge 8 is thereby further increased since the contact forces at the second annular sealing edge 8 are increased.

In accordance with FIG. 3, the gasket is composed of FKM, for example, and has a hardness of 70 Shore A.

In accordance with FIGS. 1 to 3, the measuring probe 3 is displaceably arranged in the gasket 2. The measuring probe can thereby be adapted to the use or to the application.

In accordance with FIG. 1, the gasket 2 is retrofittable. The measuring probe 3 can be subsequently installed or can be removed again at a later point in time.

The process connection 1 is preferably supplied in pre-assembled form so that the process connection 1 is present for a user in a ready-to-connect form.

Figure 8:
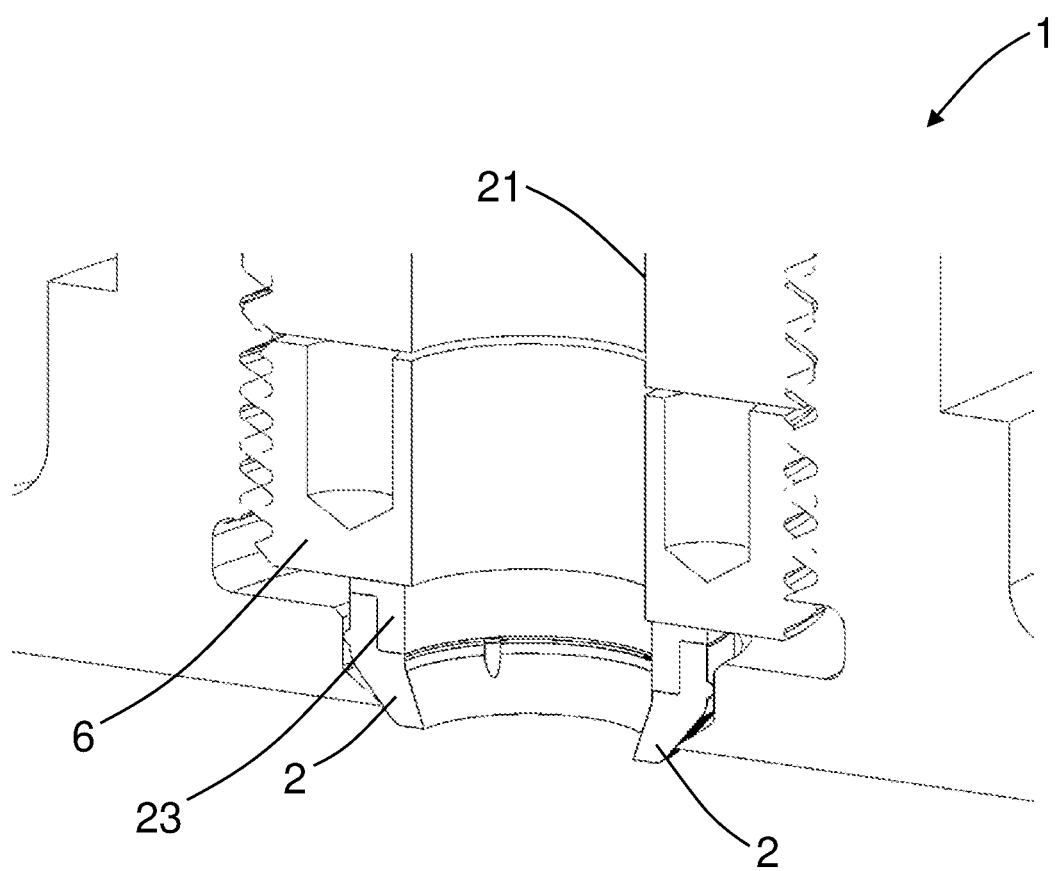
FIG. 8 a gasket having a spacer.

In accordance with FIG. 8, a spacer 23 is arranged between the downholder 6 and the gasket 2. The spacer 23, for example, has a higher friction with respect to the gasket 2 than with respect to the downholder 6. A slide bearing is thus formed between the downholder 6 and the spacer 23 on the assembly of the downholder 6. Only compressive forces are thus exerted on the gasket 2 and no rotary forces that could lead to a slipping of the gasket 2.

The spacer 23 composed of a hard material, steel or stainless steel for example, can be used to avoid an inward bulging of the gasket 2 toward the measuring probe on the application of the compressive force by the downholder 6. This spacer 23 provides that the gasket 2 composed of a soft material only bulges outwardly. The spacer 23 also maintains its shape after exertion of the force by the downholder 6.

Figure 9:
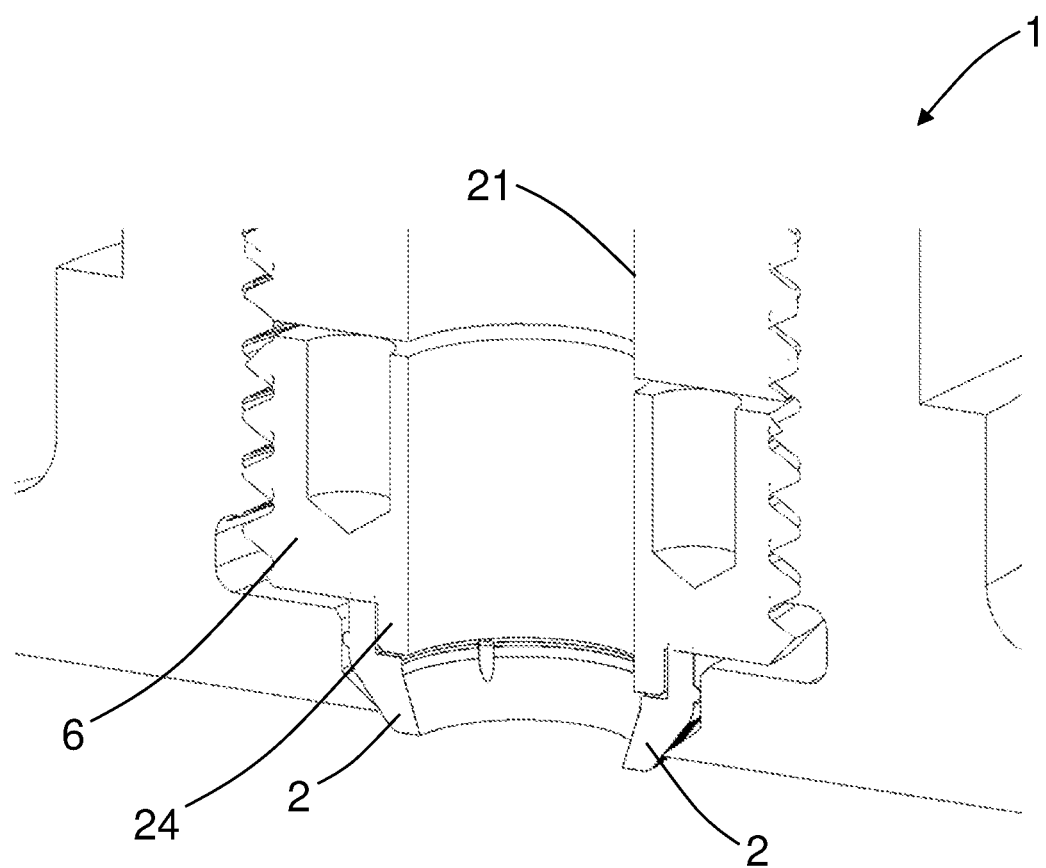
FIG. 9 a gasket having a straight neck.
Figure 10:
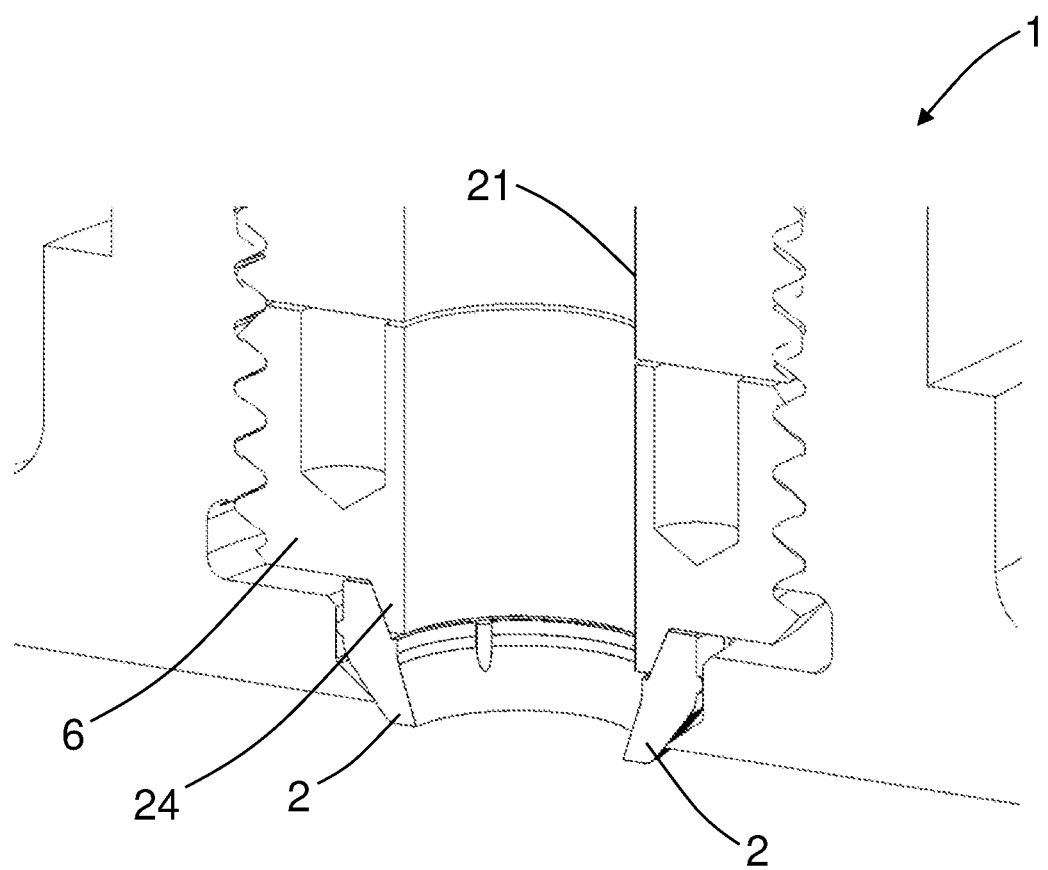
FIG. 10 a gasket having a conical nose.

In accordance with FIG. 9 and FIG. 10, the downholder 6 has a nose 24 that projects into the gasket 2. The nose 24 can also be called a protrusion since the nose 24 projects at least partly into the gasket 2 and thus stabilizes and/or positions the gasket 2. In accordance with FIG. 9, the neck 24 has a straight or cylindrical shape. In accordance with FIG. 10, the neck 24 has a conical shape.

REFERENCE NUMERALS 1 process connection
2 annular gasket
3 cylindrical measuring probe
4 sensor
5 process environment
6 downholder
7 first annular sealing edge
8 second annular sealing edge
9 conical outer jacket surface
10 conical outer jacket angle
11 conical inner surface
12 conical inner angle
13 dot-shaped burls
14 circular cylindrical surface
15 linear ribs
16 contact surface of the gasket
17 longitudinal axis of the measuring probe
18 conical inner jacket surface
19 housing
20 planar side
21 clamping ring screw connection
22 seal
23 spacer
24 neck

The invention claimed is:

1. A process connection comprising:
an annular gasket; and
a cylindrical measuring probe of a sensor,
wherein:
the gasket is provided to seal a process environment,
the gasket is disposed between the process connection and the cylindrical measuring probe;
the gasket is fixable by means of a threaded downholder, the downholder exerting a compressive force on the gasket;
the gasket contacts a first annular sealing edge at the process connection;
the gasket surrounds the cylindrical measuring probe at a second annular sealing edge;
the gasket has at least one conical outer jacket surface having a conical outer jacket angle and the process connection has a conical inner surface having a conical inner angle;
the gasket has a conical inner jacket surface that faces the cylindrical measuring probe, the conical angle of the gasket and an outer surface of the gasket forming an acute angle with one another,
with the gasket contacting the first annular sealing edge of the conical inner surface of the process connection;
with the conical outer jacket angle being smaller than the conical inner angle; and
the gasket has an acute angle in cross-section at the second annular sealing edge.

2. The process connection in accordance with claim 1, wherein a spacer is arranged between the downholder and the gasket body.

3. The process connection in accordance with claim 1, wherein the downholder has a nose that projects into the gasket.

4. The process connection in accordance with claim 1, further comprising dot-shaped burls that are arranged along a periphery at a circular cylindrical outer surface of the gasket.

5. The process connection in accordance with claim 1, further comprising linear ribs that are arranged along a periphery at a circular cylindrical inner surface of the gasket, with the linear ribs being in parallel with one another.

6. The process connection in accordance with claim 1, wherein a contact surface of the gasket for the downholder is arranged perpendicular to a longitudinal axis of the measuring probe.

7. The process connection in accordance with claim 1, wherein the gasket is composed of a flexible material and has a hardness of 40-90 Shore A.

8. A process connection comprising:
an annular gasket; and
a cylindrical measuring probe of a sensor,
wherein:
- the gasket is provided to seal a process environment,
- the gasket is disposed between the process connection and the cylindrical measuring probe;
- the gasket is fixable by means of a downholder, the downholder exerting a compressive force on the gasket;
- the gasket contacts a first annular sealing edge at the process connection;
- the gasket surrounds the cylindrical measuring probe at a second annular sealing edge;
- the gasket has at least one conical outer jacket surface having a conical outer jacket angle and the process connection has a conical inner surface having a conical inner angle;
- the gasket has a conical inner jacket surface that faces the cylindrical measuring probe the conical angle of the gasket and an outer surface of the gasket forming an acute angle with one another,
- with the gasket contacting the first annular sealing edge of the conical inner surface of the process connection;
- with the conical outer jacket angle being smaller than the conical inner angle;
- the gasket has an acute angle in cross-section at the second annular sealing edge; and
- the measuring probe is displaceably arranged in the gasket.

9. The process connection in accordance with claim 1, wherein the gasket is retrofittable.

10. A process connection comprising:
an annular gasket; and
a cylindrical measuring probe of a sensor,
wherein:
- the gasket is provided to seal a process environment,
- the gasket is disposed between the process connection and the cylindrical measuring probe;
- the gasket contacts a first annular sealing edge at the process connection;
- the gasket surrounds the cylindrical measuring probe at a second annular sealing edge;
- the gasket has at least one conical outer jacket surface having a conical outer jacket angle and the process connection has a conical inner surface having a conical inner angle;
- the gasket has a conical inner jacket surface that faces the cylindrical measuring probe, the conical angle of the gasket and an outer surface of the gasket forming an acute angle with one another,
- with the gasket contacting the first annular sealing edge of the conical inner surface of the process connection;
- with the conical outer jacket angle being smaller than the conical inner angle;
- the gasket has an acute angle in cross-section at the second annular sealing edge;
- the gasket (2) surrounding the cylindrical measuring probe (3) at a second annular sealing edge (8); and
- the gasket is fixable by means of a downholder, the downholder exerting a compressive force on the gasket and having a nose that projects into the gasket, with the downholder (6) having a nose (24) that projects into the gasket.

11. The process connection in accordance with claim 10, wherein the measuring probe is displaceably arranged in the gasket.

* * * * *